United States Patent
Lafontaine et al.

(10) Patent No.: US 8,423,518 B2
(45) Date of Patent: Apr. 16, 2013

(54) REPRESENTATION OF MULTIPLE MARKUP LANGUAGE FILES IN ONE FILE FOR THE PRODUCTION OF NEW MARKUP LANGUAGE FILES

(75) Inventors: Semer Lafontaine, Upton-On-Severn (GB); Nigel Whitaker, Upton-On-Severn (GB); Tristan Mitchell, Upton-On-Severn (GB)

(73) Assignee: Deltaxml Limited, Worcester (GB)

( * ) Notice: Subject to any disclaimer, the term of this patent is extended or adjusted under 35 U.S.C. 154(b) by 0 days.

(21) Appl. No.: 12/452,309

(22) PCT Filed: Jul. 4, 2008

(86) PCT No.: PCT/GB2008/050534
§ 371 (c)(1),
(2), (4) Date: Mar. 11, 2010

(87) PCT Pub. No.: WO2009/004386
PCT Pub. Date: Jan. 8, 2009

(65) Prior Publication Data
US 2010/0185706 A1    Jul. 22, 2010

(30) Foreign Application Priority Data

Jul. 4, 2007 (GB) .................................. 0712935.6

(51) Int. Cl.
*G06F 17/30* (2006.01)

(52) U.S. Cl.
USPC .......................................... 707/692; 707/822

(58) Field of Classification Search .................. 707/692, 707/822
See application file for complete search history.

(56) References Cited

U.S. PATENT DOCUMENTS

| | | | |
|---|---|---|---|
| 6,542,906 B2 * | 4/2003 | Korn | 707/641 |
| 6,848,078 B1 * | 1/2005 | Birsan et al. | 715/206 |
| 7,340,502 B2 * | 3/2008 | Richardson et al. | 709/204 |
| 7,454,745 B2 * | 11/2008 | Aridor et al. | 717/122 |

(Continued)

FOREIGN PATENT DOCUMENTS

| | | |
|---|---|---|
| EP | 1 325 432 | 7/2003 |
| WO | 02/08890 | 1/2002 |

OTHER PUBLICATIONS

Anonymous, "How DeltaXML Represents Changes to XML Files," www.archive.org (online), Apr. 30, 2007, XP002505741, retrieved from the Internet: web.archive.org/web/200070430201237/www.deltaxml.com/dxml/library/how-deltaxml-represents-changes.html, [retrieved on Nov. 27, 2008].

(Continued)

*Primary Examiner* — Shyue Jiunn Hwa
(74) *Attorney, Agent, or Firm* — Carmody & Torrance LLP

(57) ABSTRACT

A method and apparatus for representing three or more related markup language source files in a single delta file is provided. The markup language source files are represented in such a way that the delta file is easily processed to produce one or more merged combinations of the source files. The method and apparatus ensure that any one of the original files can be extracted from the delta file. Moreover, when one or more documents are deleted from the delta file, leaving two or more documents within the modified delta file, the remaining file is a valid delta file for any remaining documents. The method and apparatus are suited for use, but not exclusively, with XML documents/files.

6 Claims, 3 Drawing Sheets

U.S. PATENT DOCUMENTS

| | | | | |
|---|---|---|---|---|
| 7,464,330 B2* | 12/2008 | Bishop et al. | ............... | 715/235 |
| 7,774,321 B2* | 8/2010 | Tomic et al. | ............... | 707/690 |
| 7,895,512 B2* | 2/2011 | Roberts | ............... | 715/229 |
| 2003/0158854 A1* | 8/2003 | Yoshida et al. | ............... | 707/101 |
| 2003/0167446 A1* | 9/2003 | Thomas | ............... | 715/513 |
| 2004/0073541 A1* | 4/2004 | Lindblad et al. | ............... | 707/3 |

OTHER PUBLICATIONS

Anonymous, "Introduction to DeltaXML Sync," www.archive.org (online), May 14, 2007, XP002505742, retrieved from the Internet: web.archive.org/web/20070514172218/www.deltaxml.com/dxml/library/using-sync.html [retrieved on Nov. 26, 2008].

Anonymous, "Unified Delta Format," www.archive.org (online), May 15, 2007, XP002505743, retrieved from the Internet: web.archive.org/web/20070515140043/www.deltaxml.com/dxml/library/unified-delta-format.html.

Robin La Fontaine, "A Generalized Grammar for Three-Way XML Synchronization," XML 2005 Conference (online), Nov. 17, 2005, XP002505744, retrieved from the Internet: www.idealliance.org/proceedings/xml05/abstracts/paper102.htm1 [retrieved on Nov. 26, 2008].

Robin Lafontaine, "Russian Dolls and XML: Handling Multiple Versions of XML in XML," XML 2003 conference (online), Dec. 7, 2003, XP002505745, retrieved from the Internet: www.idealliance.org/papers/dx_xml03/html/abstract/5-01-03.html [retrieved on Nov. 26, 2008].

* cited by examiner

Construct Logical Delta Element for an Element

REPRESENTATION OF MULTIPLE MARKUP LANGUAGE FILES IN ONE FILE FOR THE PRODUCTION OF NEW MARKUP LANGUAGE FILES

CROSS REFERENCE TO RELATED APPLICATIONS

This application is a National Stage application of International Application No. PCT/GB2008/050534, filed Jul. 4, 2008, the subject matter of which is incorporated by reference in its entirety.

FIELD OF THE INVENTION

The present invention relates to a method and apparatus for representing three or more related markup language source files in a single file referred to herein as a delta file or a Logical Delta™ file. The markup language source files are represented in such a way that the delta file may easily be processed to produce one or more merged combinations of the source files. The method and apparatus ensure that any one of the original files can be extracted from the delta file. Moreover, when one or more documents are deleted from the delta file, leaving two or more documents within the modified delta file, the remaining file is a valid delta file for any remaining documents. More particularly the present invention is suited for use, but not exclusively, with XML documents/files.

BACKGROUND AND BACKGROUND ART

XML is now in widespread use as a storage or exchange format for documents and data. Such documents and data generally undergo changes and these changes need to be monitored and actions taken based on what changes have been made. There are many implementations of XML comparison technology including that described in EP1325432 which is an earlier development by the same inventor, the content of which is incorporated by reference, and others including Altova Spy DiffDog™, Microsoft™ Diff and Patch, IBM Alphaworks™, XMLcmp™, Versim™. Generally these take two documents and generate some representation of the differences between them, often referred to as a 'delta' file.

There is another set of problems specifically relating to representing changes between three or more documents. For example, when a document is edited simultaneously by two different editors then the result of the two edits and the original common base document represent three documents that need to be compared in order to resolve any differences or conflicts between the edits. Another example is a document that has been translated, and typically the translated document has the same structure as the original but with text in a different language. When the original is modified, it is necessary to look at the changes between the three existing documents (i.e. the original, the translated original and the modified original) in order to enable a new version of the translation to be produced.

Application areas for more than three documents include extensions of the above, for example a document edited by three or more editors simultaneously or the update of more than one translation. There is also the common situation of a 'travelling draft' where a document is edited in succession (or simultaneously) by two or more editors as part of a contract negotiation or development of a narrative.

Solutions in these areas are considerably more complex than those involving two documents. For two documents there are limited changes for any particular node, where a node is an attribute, text item or element/subtree. These are as follows:
1. The nodes are equal
2. The nodes are not equal
3. The node is in only one of the two documents For three or more documents the number of change possibilities increases considerably, because a node in each document may be equal to a corresponding node in any one or more of the other documents. Most of the current approaches to combining three or more XML documents into one are based on the requirements of version control systems. The two key criteria for such systems are to minimize storage space and to minimize the time taken to retrieve a specified version from an archive. Version control systems are not useful as part of a solution to the above problems because the representation of the differences is designed only to re-construct one particular version, rather than for general processing of the differences.

One proposal for a format for a multiple version document is DeltaXML Unified Delta™, described in "Russian Dolls and XML: Handling Multiple Versions of XML in XML" XML 2003, December, 2003, USA. This is more suited to processing of the changes between versions and a generic solution to the above problems is proposed in "A Generalized Grammar for Three-way XML Synchronization" XML 2005, USA. A study of this will show that although a generic solution is possible, the architecture and execution of this is complex. In particular, a grammar is proposed for specifying the required result based on a rule set for combination. From this rule set, code can be generated to process a Unified Delta™ document to generate the required result.

Implementation of the Unified Delta™ format shows that not only is the code complex but it is also quite slow to execute. One reason for this is that at each point in the subtree hierarchy a deep traversal of the document subtree is necessary in order to determine the relationship of the different document versions within the subtree, for example to determine if the subtree is the same (equal) in all or some of the documents. The present invention seeks to eliminate this problem.

In addition, existing solutions do not cater for extensions to show other forms of relationship between a common element as it may appear in the different documents, for example to indicate if all of the text within the elements is the same, or that they have the same date stamp. The present invention seeks to address this problem by providing a method and apparatus not only to represent different variations of equality relationship but also to ensure that subsets of the Logical Delta™ file are themselves valid.

SUMMARY OF THE INVENTION

The present invention therefore provides a method of representing three or more markup language source files in one markup language delta file, the method comprising the steps of: a) determining that each of the three or more markup language source files has a root element of the same type, where elements of the same type are elements with the same name and namespace; b) creating a delta file with a root element of the same type as the root element of the three or more markup language source files; c) recording in the delta file information about the contents of the three or more markup language source files which is not common to all the source files wherein each element in the source files has the same type as its corresponding element in the delta file and has ancestor elements of the same type as the corresponding ancestor elements in the delta file up to and including the root element, any two elements that are siblings in a source file have corresponding elements that are siblings in the delta file, and any text node directly or indirectly within a source file element has a corresponding text node contained directly or indirectly within the corresponding delta file element; d) determining which subtrees in the source files are common to two or more of the source files; and e) identifying in the delta file common subtrees as equal whereby any one of the source files may be extracted from the delta file and when a source file is removed from the delta file, the information remaining in the resulting delta file remains true with respect to at least step c) and step e) for the remaining markup language source files.

In a second aspect the present invention provides a tangible medium storing computer readable instructions for generating a delta file representing three or more markup language source files, the computer readable instructions comprising: a) instructions for determining that each of the three or more markup language source files has a root element of the same type, where elements of the same type are elements with the same name and namespace; b) instructions for creating a delta file with a root element of the same type as the root element of the three or more markup language source files; c) instructions for recording in the delta file information about the contents of the three or more markup language source files which is not common to all the source files wherein each element in the source files has the same type as its corresponding element in the delta file and has ancestor elements of the same type as the corresponding ancestor elements in the delta file up to and including the root element, any two elements that are siblings in a source file have corresponding elements that are siblings in the delta file, and any text node directly or indirectly within a source file element has a corresponding text node contained directly or indirectly within the corresponding delta file element; d) instructions for determining which subtrees in the source files are common to two or more of the source files; and e) instructions for identifying in the delta file common subtrees as equal whereby any one of the source files may be extracted from the delta file and when a source file is removed from the delta file, the information remaining in the resulting delta file remains true with respect to at least step c) and step e) for the remaining markup language source files.

In a third aspect the present invention provides a tangible medium storing a computer readable delta file being a representation of at least two markup language source files, the delta file containing information about the contents of the at least two markup language source files which is not common to all the source files wherein each element in the source files has the same type as the corresponding element in the delta file, elements of the same type being elements with the same name and namespace; each ancestor element in the source files has the same type as the corresponding ancestor elements in the delta file up to and including the root element; any two elements that are siblings in a source file have corresponding elements that are siblings in the delta file; any text node directly or indirectly within a source file element has a corresponding text node contained directly or indirectly within the corresponding delta file element; and the equality of any subtrees in the source files are indicated in the delta file at each level in the tree structure whereby the delta file is capable of being extended to contain three or more markup language source files.

The present invention is a new and useful improvement over the Unified Delta™ format referred to above. Where the Unified Delta™ file indicates at each node the versions of the document in which this node appears, the present invention improves this by indicating in addition one or more relationship(s) between this node as it appears in the different documents. In particular there is an indication to show if this node is the same, i.e. equal, in the documents. In the present invention two nodes that are equal must be identified as equal. This provides the characteristic that a delta of two documents can be extracted directly from a delta of three or more documents.

The two-document delta file described in EP1325432 does have the characteristic that at any node the equality or otherwise of the two documents is indicated using a delta attribute equal to "unchanged", meaning the two subtrees are equal, or "modify" meaning the two subtrees are not equal. However, it is evident that this does not extend to three or more documents and covers only the relationship of equality. The present invention therefore represents a new and useful improvement over this two-document delta file.

The actual format of the present invention generally follows a structure similar to that of the Unified Delta™ format but the attribute indicating the documents in which an element occurs is enhanced so that it also shows whether the element is equal in the documents or different, and it is extended to show other types of equality relationship. The Unified Delta™ format makes no assertion about whether two nodes that are equal in two or more documents must have all their content shared in the Unified Delta™ file, whereas the present invention asserts that this must be true.

The present invention also permits additional relationship information to be provided in the form of attributes on elements. An attribute indicating whether an element is equal in the different documents is required for each element. Additionally, one or more attributes may be present to indicate other forms of equality or other similar relationship. For example, two elements may have all their text equal in two of the documents even though the elements are not equal in other respects. As another example, two elements might be equal if a certain attribute representing a date stamp is ignored. Again, this can be indicated in an attribute. The presence of such attributes enables complex derivatives of the multiple documents to be generated with minimal programming effort.

With the present invention where the delta file represents M source files (where $3 \leqq M$) a second delta file representing N source files (where N<M) can be extracted leaving the first delta file representative of N−M source files. Also, an additional source file can be added to a delta file of N source files to create a delta file representing N+1 source files. Moreover, a first delta file representing M source files can be added to a second delta file representing N source files to create a third delta file representing N+M source files.

BRIEF DESCRIPTION OF THE DRAWINGS

An embodiment of the present invention will now be described by way of example only with reference to the accompanying drawings, in which.

DETAILED DESCRIPTION OF AN EXEMPLARY EMBODIMENT

Figure 1:
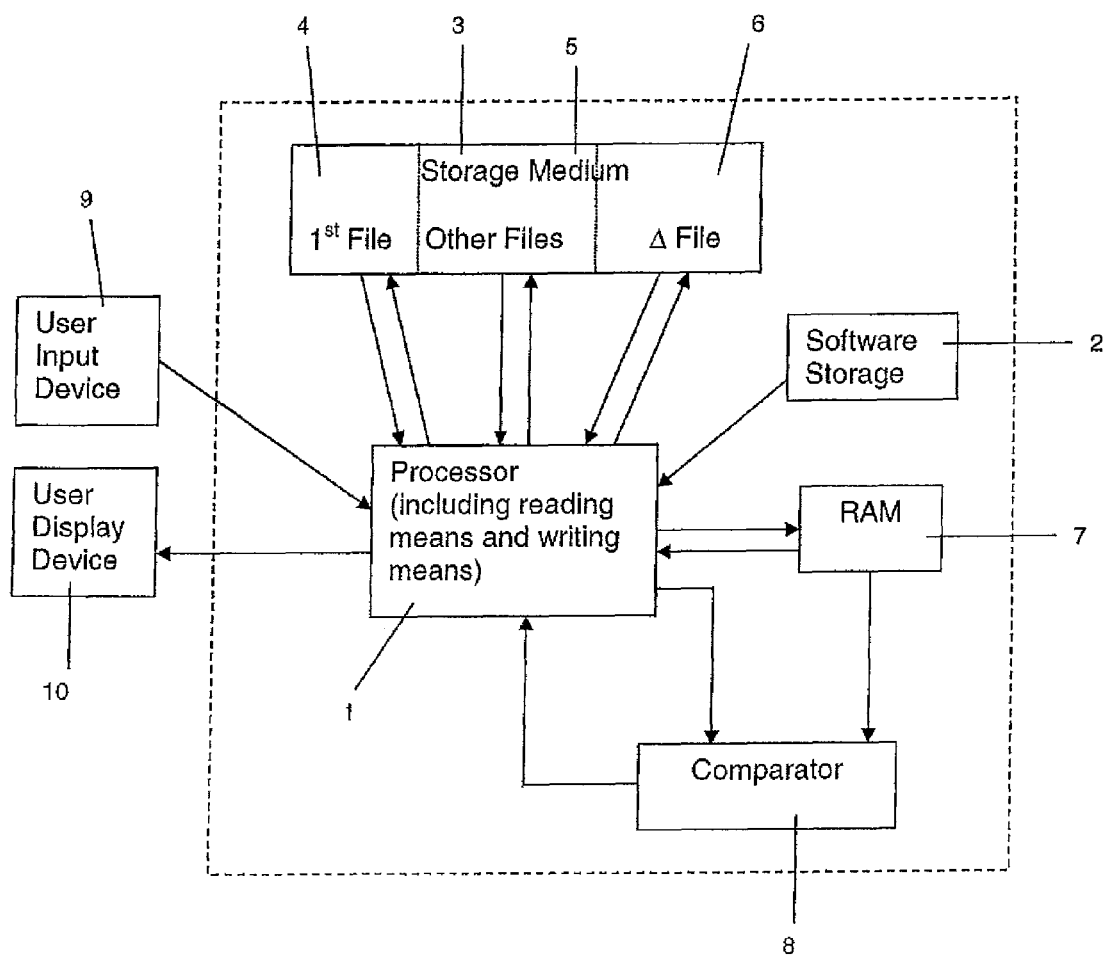
FIG. 1 is a schematic diagram of a hardware implementation in accordance with the present invention.

The multi-version document created using the method of the present invention is known as a Logical Delta™ file. This Logical Delta™ file is designed in a way that is applicable to any number of documents and has the important characteristic that when one or more documents are removed, the resultant Logical Delta™ file is still a Logical Delta™ document, i.e. it adheres to the requirements of a Logical Delta™ file as described below.

In the Logical Delta™ document, attributes are used within the document to indicate the status of each element in terms of whether it is present in one or more of the original documents and whether this element is 'equal' in two or more of the documents. These attributes are called Logical Delta™ attributes. The definition of 'equal' is potentially different for each of the Logical Delta™ attributes.

However, one Logical Delta™ attribute is always present on every element, which in this embodiment is named the logdelta attribute. The definition of 'equal' for the logdelta attribute is deep-equal, as defined in [XQuery 1.0 and XPath 2.0 Functions and Operators, W3C Recommendation 23 Jan. 2007, http://www.w3.org/TR/2007/REC-xpath-functions-20070123/ "XPath 2.0", 2004, Michael Kay, Wiley ISBN 0-764-56910-4], the contents of which is incorporated herein by reference. For other Logical Delta™ attributes both the name of the attribute and the definition of 'equal' will vary. The only requirements are that the definition of 'equal' adheres to the following:
1. The function returns the result TRUE or FALSE given any two subtrees.
2. The function is commutative.
3. The function returning TRUE is transitive in that if A=B and B=C then A=C.
4. The function always returns the same value for two specific elements, and it returns the same value when one or other of these elements is replaced by an element that is deep-equal to the original one, e.g. with changed attribute ordering.

Where a Logical Delta™ attribute does not explicitly appear in the Logical Delta™ file it is assumed to be the same as its parent and this applies recursively up to the root element of the file.

In this preferred embodiment, the value of each instance of the logical attribute will take the general form, using an Extended Backus-Naur Format (EBNF) notation:
  attribute value=document identifier, (['=' | '!='], document identifier)*
  document identifier=alphabetic-character, (alphabetic-character | digit)*
  alphabetic character="A" | "B" | "C" | "D" | "E" | "F" | "G" | "H" | "I" | "J" | "K" | "L" | "M" | "N" | "O" | "P" | "Q" | "R" | "S" | "T" | "U" | "V" | "W" | "X" | "Y" | "Z";
  digit="0" | "1" | "2" | "3" | "4" | "5" | "6" | "7" | "8" | "9";

An example is the value for an element that occurs in two documents, where the documents have document identifiers 'A' and 'B'. The relation 'A=B' means that the element as it appears in document 'A' is 'equal' to this element as it appears in document 'B'. The relation 'A!=B' means that the element as it appears in document 'A' is 'not equal' to this element as it appears in document 'B'

This form of value has the characteristic that it can be extended to three or more documents. Thus for three documents A, B and C, examples of relations include 'A=B=C', 'A!=B=C', 'A=B!=C', 'A=C!=B'. Note that any 'equal' documents are grouped, for example A=B!=C=D, or A=C!=B!=D. Here, 'equal' (=) has precedence over 'not equal' (!=), so that the examples are equivalent to: (A=B)!=(C=D), and (A=C)!=B!=D respectively. The relation 'equal' is also transitive, and although 'not equal' is not generally transitive, in this case it is because we require that any subtree that is 'equal' to any other must be in the same "equal set" (see below), therefore any two subtrees in different "equal sets" are by definition 'not equal', hence 'not equal' is transitive in this situation. Because both relations are also commutative, in this context, the order can be varied to generate a canonical form.

Because of the ease of processing, preferably there is a single canonical string to represent any set of 'equal' documents, the following algorithm is used to generate the Logical Delta™ value:
1. Take the first (in alphabetical order) document indicator, e.g. A;
2. Concatenate this with all other document indicators for documents that are 'equal', in alphabetical order, separated by an '=' sign, to form an "equal set";
3. Take the next in alphabetical order from any remaining in the set of documents that have not yet been used;
4. Repeat steps 2 and 3 until all documents have been referenced, then go to 5;
5. Concatenate each of the "equal sets" in the order they were generated using '!='.

This canonical representation makes processing easier because the processor does not need to check for variations, for example 'A=B' will never be represented as 'B=A'.

Processing the Logical Delta™ File

As an illustration of the improved simplicity of processing, consider the following XML Stylesheet Language for Transformation (XSLT) template match, which selects any element where none of the three documents are equal to each other, and can be represented as:

match="*[@dxl:logdelta='A!=B!=C']"

Without this representation of the fact that none of these nodes are equal in the three documents, this would need to be determined and to do so it may be necessary to process the entire subtree to determine this fact. Given that subtrees can be very large and complex, this can considerably reduce processing times.

It is immediately evident that not only is the Logical Delta™ selection process much simpler, but it will also execute faster, particularly on larger documents because any 'equal' relationship function implies a traversal of the entire subtree in order to check the match.

Variants of the Logical Delta™

There are two independent variants of the Logical Delta™ methodology:
1. Changes-only Logical Delta™ methodology which does not contain any data that is common to all of the documents.
2. Canonical Logical Delta™ methodology which has all text and attributes wrapped in special elements even when they have not been changed.

Changes-only Logical Delta™ methodology: this variant maintains the concept of a 'changes only' delta and a 'full context' delta, as defined in EP1325432. For two documents, the full context contained all the data in both documents. 'Changes only' suppressed unchanged data so was smaller and showed only the changes. This can be extended for three or more documents to excluding the content in the case where all the documents are equal. Any one of the original documents may then be combined with the 'changes only' Logical Delta™ file to generate any of the other documents. Thus, the 'changes only' Logical Delta™ file is smaller and could potentially be used as a more secure form of information transfer.

Canonical Logical Delta™ methodology: for most processing it is advantageous to hold text, attributes and subtrees that have no variations, either because they were present in only one document or because they were present in more than one but were equal in all of them, in the same structure as in the original document. There are some processing situations where it is advantageous to have all text and attributes in the same format, independent of changes. In these cases this variant proposes a canonical form whereby all text items and attributes are wrapped even when they have not changed.

Validation

A Logical Delta™ document is valid if the following are all true:

1. Extracted Documents Valid: Any individual document X extracted from the Logical Delta™ file is deep-equal to the document X that was added. In accordance with XQuery 1.0 and XPath 2.0 Functions and Operators, W3C Recommendation 23 Jan. 2007 (http://www.w3.org/TR/2007/REC-xpath-functions-20070123/, mentioned earlier) this means that they must contain items that are pairwise deep-equal; and for two items to be deep-equal, they must either be atomic values that compare equal, or nodes of the same kind, with the same name, whose children are deep-equal. In other words, the items in corresponding positions in each sequence must be deep-equal to each other and if the items are nodes, they are compared by examining their children and attributes recursively.

2. Logical Delta™ Attributes Valid: Any Logical Delta™ attribute on any element, including the root element, contains a superset of all of the document identifiers mentioned in the Logical Delta™ attributes of the same name on all of its child elements. All Logical Delta™ attributes on the same element will contain the same set of document identifiers.

3. logdelta Attributes Valid: The logdelta attribute on each element, including the root element, is a valid Logical Delta™ attribute and:

If two document subtrees are denoted as equal, then any subelement that references either document must reference both and indicate that they are equal, either explicitly in the logdelta attribute or implicitly by omission of the logdelta attribute because the value of the logdelta attribute is the same as that of its parent element.

If two document subtrees are denoted as not equal then if the subtrees are extracted there must be a difference between them.

4. All Subset Deltas Valid: If any one document is removed from a Logical Delta™ file of three or more documents then the Logical Delta™ file remaining is valid.

The statement above that all subset deltas are valid represents an important improvement over the Unified Delta™ because it means that it is possible to determine by simple removal of some documents the differences between any two (or more) documents from a multi-document Logical Delta™ file.

1.1 Generating a Logical Delta™ File for Three or More Documents

As illustrated in FIG. 1, the software that generates a Logical Delta™ document requires the following resources: a processor 1 for carrying out the functional operations defined in the software; program storage 2; a data storage device 3 which for ease of reference may be sub-divided into first 4, second 5 and third 6 etc. storage regions; additional RAM 7 for temporary storage of data whilst the software is running; a comparator 8 for comparing the contents of XML files; and user input and output interfaces 9, 10. Most conveniently, the software is implemented on a conventional digital computer. However, the method of generating a Logical Delta™ document described herein is not restricted to such an implementation.

Figure 2:
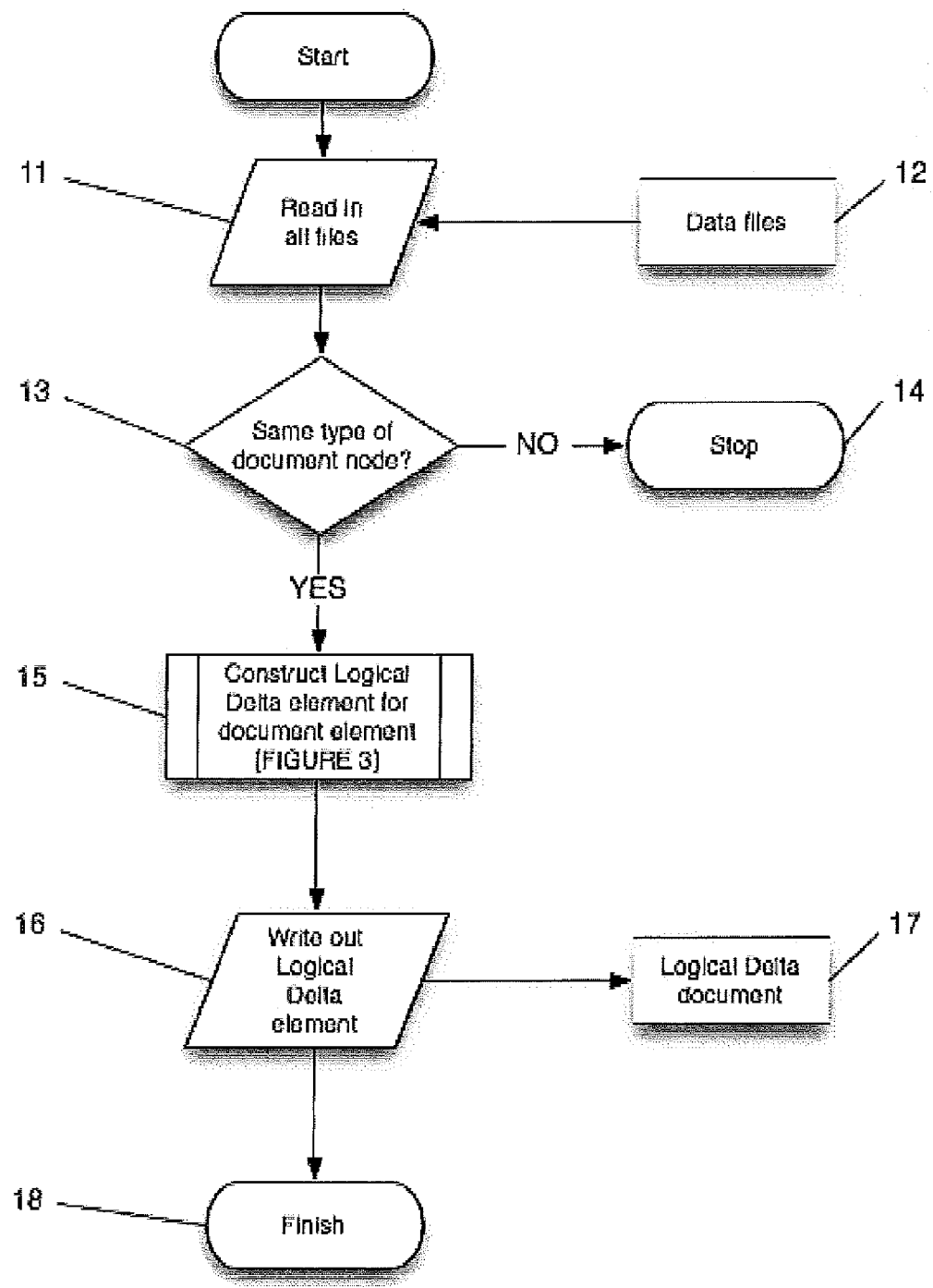
FIG. 2 is a diagram of the process steps for the creation of a Logical Delta™ document, in accordance with the present invention.
Figure 3:
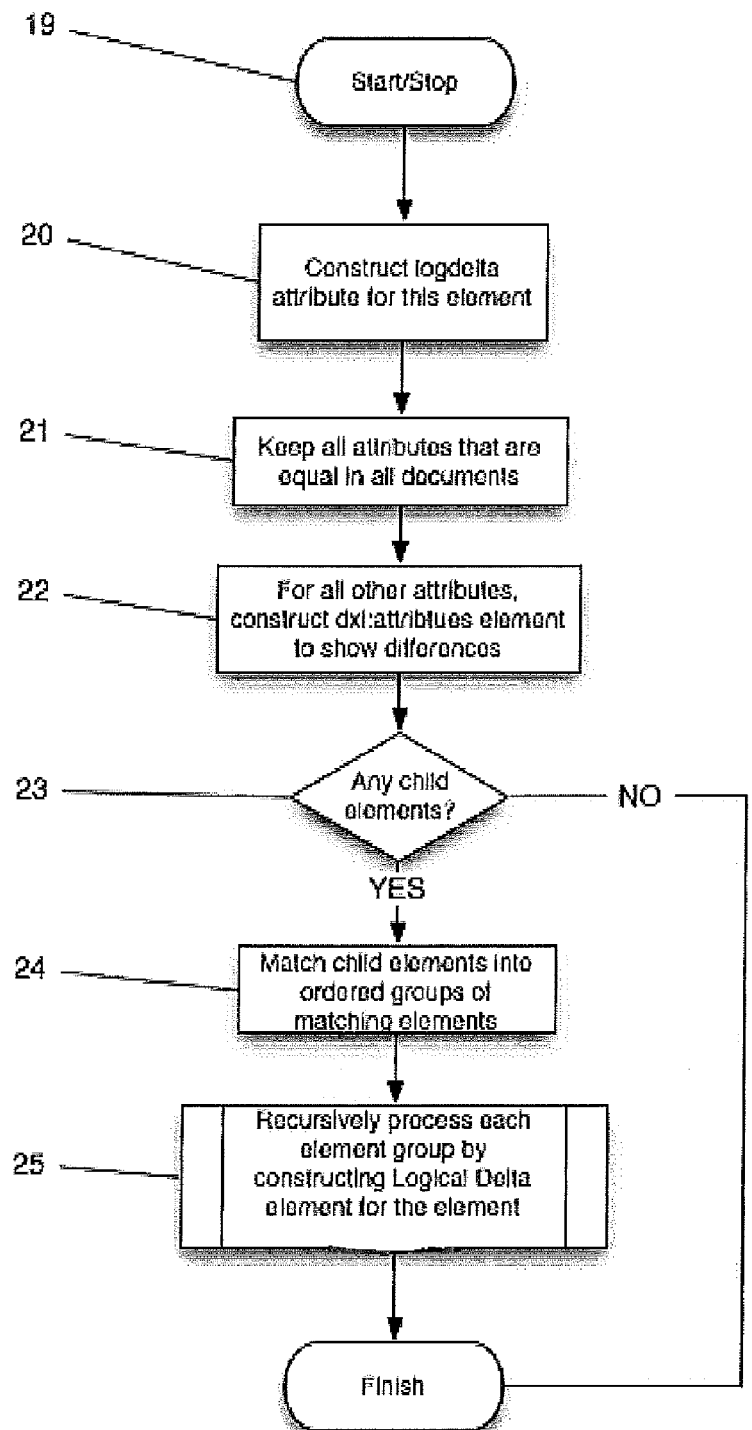
FIG. 3 is a diagram of the process steps for applying the method of the present invention to an individual element of a markup language source document.

A method for constructing a Logical Delta™ document from three or more input files is illustrated in FIG. 2. First the files 12 are read into the processor memory 11. Next a check is made 13 to ensure that the document nodes are the same type, i.e. local name and namespace, and if not then the process ends 14 because it is not possible to construct a Logical Delta™ document. The Logical Delta™ element is then constructed 15 for each document element including the root element, as illustrated in FIG. 3. Once completed, the Logical Delta™ document is then written out 16 and recorded on a disk or some other form of document storage 17. The process is then finished 18.

The Logical Delta™ document will at the very least contain information about the contents of each of the source files which is not common to all of the source files wherein each element in the source files has the same type as the corresponding element in the delta file, elements of the same type being elements with the same name and namespace; each ancestor element in the source files has the same type as the corresponding ancestor elements in the delta file up to and including the root element; any two elements that are siblings in a source file have corresponding elements that are siblings in the delta file; any text node directly or indirectly within a source file element has a corresponding text node contained directly or indirectly within the corresponding delta file element; and the equality of any subtrees in the source files are indicated in the delta file at each level in the tree structure. The information may be limited to differences between the source files or may include content which is common to all of the source files in which case the common content is shared and will appear only once in the Logical Delta™ document.

FIG. 3 shows the construction of a Logical Delta™ element for each document element which appears in one or more of the documents. The first step 20 is to determine which elements are deep-equal to each other and from this construct the logdelta attribute 20. The next step 21 is to identify the attributes on the document element that are equal in all documents and to represent these as attributes on this element in the Logical Delta™ file. In the following step 22 all other attributes are represented in a dxl:attributes element with changes shown. The method then continues to process the child elements, if any, 23.

For the child elements, the first step 24 is to match up the child nodes of this element for all the documents so that all of the child nodes of any group of deep-equal elements (as determined in the comparison of the parent element) are matched up exactly, and any other elements are matched based on the element type, content and position in the documents. This will produce an ordered list of elements each of which occurs in one or more of the documents. For each member of this list of child elements, the next step 25 is to recursively process the list to construct a Logical Delta™ element for this element.

Any additional Logical Delta™ attributes may then be added to the elements in the Logical Delta™ document.

2 Logical Delta™ Format Description

The following section describes the format for the Logical Delta™ document.

2.1 Elements and Attributes

This is a list of the elements used by this format:

| Element name | Content | Purpose |
|---|---|---|
| dxl:attributes | One or more elements, each of which has a local-name and namespace corresponding to an attribute belonging to the parent element. | Details any differences between the attributes associated with the parent element |
| dxl:text | PCDATA, i.e. text | To record a text item that appeared in one or more of the input documents. |
| dxl:value | CDATA representing the value of an attribute | To record an attribute value that appeared in one or more of the input documents. |
| dxl:textGroup | One or more dxl:text elements | Contains all variants of text at this point in the tree. |

This is a list of the attributes used by the Logical Delta™ document

| Attribute name | Content | Purpose |
|---|---|---|
| dxl:logdelta | A string containing one or more of the document identifiers, grouped according to equality. | Details the documents in which this data item appeared. If it appeared in more than one document, this attribute also indicates whether the data items were the same or different. For example, dxl:logdelta = "A = B" means that the element appears in documents A and B and they are deep-equal. |
| dxl:XX | The XX is a user-specified name. The content is as dxl:logdelta | As for dxl:logdelta except that the meaning of '=' is user-defined. |

2.2 Description

The structure of a conventional XML file may be specified by a set of element type declarations in a DTD or XML Schema. Any amendment of the XML file is only valid if it is valid for its DTD or the XML Schema i.e. the XML file before the amendment is valid for its DTD or XML Schema and the XML file after the amendment is also valid for its DTD or XML Schema. XML attributes are considered to be part of the data and so a change to the value of an attribute also needs to be recorded. However, changes to the order of attributes are not significant and are not recorded as changes. Similarly, comments and processing instructions are not considered as part of the document.

The Logical Delta™ document will have the same look and feel as the original documents and will have substantially the same markup language as the source files. In general terms, the Logical Delta™ document that is generated from a set of documents will be a union of these documents in the sense that all the data that appears in any of the documents will also appear in the Logical Delta™ document. There is no DTD or Schema for a Logical Delta™ document, but there is a set of simple rules which apply to the Logical Delta™ format and these can be expressed as a Schematron Schema [ISO/IEC 19757—Document Schema Definition Languages (DSDL)—Part 3: Rule-based validation—Schematron] the contents of which is incorporated herein by reference.

"Substantially the same markup language as the source files" means that each element in the source files will have the same type (same name and namespace) as its corresponding element in the delta file and will have ancestor elements of the same type as the ancestor elements in the delta file up to and including the root element, and any two elements that are siblings in a source document will have corresponding elements that are siblings in the delta file and any text node directly or indirectly within a source file element will have a corresponding text node contained directly or indirectly within the corresponding delta file element.

Elements, attributes and text that are identified as common to two or more of the documents are shared in the Logical Delta™ document. A subtree that appears unchanged in one or more documents will appear in the Logical Delta™ document almost exactly as it appeared in the original document(s).

2.3 Rules for a Multiple Document Logical Delta™ File

1. The root element (also known as the document node) has a dxl:logdelta attribute which references all documents in the Logical Delta™ document.
2. The dxl:logdelta attribute used in dxl:text and dxl:value elements shall not have a !=within it, i.e. all items must be equal if more than one. In a variant of the method described above this rule may be extended to other element types so that changes within such elements are not permitted and the whole element will be repeated.
3. The dxl:textGroup, dxl:text and dxl:value elements will always contain a dxl:logdelta attribute.
4. An element that is a descendant of a non-modified element, i.e. when the value of the dxl:logdelta attribute does not contain a !=, cannot have a dxl:logdelta attribute.
5. All child elements of an element with a dxl:logdelta containing '!=' must have a dxl:logdelta attribute.
6. An element with dxl:logdelta equal to A!=B must have at least one child with dxl:logdelta A, B or A!=B
7. Any PCDATA which is not wrapped in a dxl:text element is unchanged in all the documents that its parent is in.
8. Unchanged attributes of any element remain as attributes.
9. dxl:attributes is used to represent attribute changes associated with the parent element. Within dxl:attributes the child element names and namespaces match those of the original attributes.
10. dxl:attributes is always located as first child element of the element to which the attributes apply.
11. The value of changed attributes are held as dxl:value items.
12. Elements that are unordered or keyed per EP1325432 can also be handled and the deltaxml:key attribute and deltaxml:ordered attribute remain as attributes and are not subject to a change.

Examples for Three Documents

In this example, the Logical Delta™ format is applied to three documents denoted A, B and C. This can be extended to multiple documents using one or more characters.

Examples of Elements in a Logical Delta™ Document

| Document A | Document B | Document C |
|---|---|---|
| \<example\> | \<example\> | \<example\> |
|   \<person\> |   \<person\> |   \<person\> |
|     \<firstName/\> |     \<firstName/\> |     \<firstName/\> |
|     \<lastName/\> |     \<lastName/\> |   \</person\> |
|     \<tel/\> |   \</person\> | \</example\> |
|   \</person\> | \</example\> | |
| \</example\> | | |

And the Logical Delta™ file for this will be as follows:

| Logical Delta ™ File | Comments |
|---|---|
| <example dxl:logdelta="A!=B!=C"><br>    <person dxl:logdelta="A!=B!=C"><br>        <firstName dxl:logdelta="A=B=C"/><br>        <lastName dxl:logdelta="A=B" /><br>        <tel dxl:logdelta="A" /><br>    </person><br></example> | Element <lastName> appears in two documents, A and B, and is the same in both.<br>Element <tel> appears in only one document, A. |

Examples of Text in a Logical Delta™ File

| Document A | Document B | Document C |
|---|---|---|
| <example><br>  <person><br><firstName>J</firstName><br><lastName>Smith</lastName><br>  </person><br></example> | <example><br>  <person><br><firstName>John</firstName><br><lastName>Smith</lastName><br>  </person><br></example> | <example><br>  <person><br><firstName>J</firstName><br><lastName>Smith</lastName><br>  </person><br></example> |

And the Logical Delta™ file for this will be as follows:

| Logical Delta ™ File | Comments |
|---|---|
| <example dxl:logdelta="A!=B!=C"><br>  <person dxl:logdelta="A!=B!=C"><br>    <firstName dxl:logdelta="A=C!=B"><br>      <dxl:textGroup dxl:logdelta="A=C!=B"><br>        <dxl:text dxl:logdelta="A=C">J</dxl:PCDATA><br>        <dxl:text dxl:logdelta="B">John</dxl:PCDATA><br>      </dxl:textGroup><br>    </firstName><br>    <lastName dxl:logdelta="A=B=C">Smith</lastName><br>  </person><br></example> | The text in <firstName> is "J" in both A and C.<br>The text in <firstName> is "John" in document B.<br>The text in <lastName> is the same in all documents. |

Examples of Attributes in a Logical Delta™ File

| Document A | Document B | Document C |
|---|---|---|
| <example><br>  <person gender="M" age="36"><br><firstName>J</firstName><br>  </person><br></example> | <example><br>  <person gender="M" age="37"><br><firstName>J</firstName><br>  </person><br></example> | <example><br>  <person gender="M"><br><firstName>J</firstName><br>  </person><br></example> |

And the Logical Delta™ file for this will be as follows:

| Logical Delta ™ File | Comments |
|---|---|
| <example dxl:logdelta="A!=B!=C"><br>    <person dxl:logdelta="A!=B!=C" gender="M"><br>        <dxl:attributes dxl:logdelta="A!=B!=C"><br>            <age dxl:logdelta="A!=B"><br>                <dxl:value dxl:logdelta="A">36</dxl:value><br>                <dxl:value dxl:logdelta="B">37</dxl:value> | The attribute 'gender' is unchanged and so appears as a regular attribute.<br>The attribute 'age' has a value of 36 in document A and 37 in B. |

| Logical Delta ™ File | Comments |
|---|---|
|         </age><br>    </dxl:attributes><br>    <firstName dxl:logdelta="A=B=C">J</firstName><br>  </person><br></example> | Element <firstName> appears now as the second child of <person>. |

The invention claimed is:

1. In a processing device having a memory in which is stored instructions for implementing a method of representing contents of three or more markup language source files in one markup language delta file whenever an element type of a root element of each of the three or more markup language source files is the same, the method comprising the steps of:
   a) accessing three or more markup language source files from the memory and determining that the element type of the root element of each of the three or more markup language source files is the same, where elements of the same type are elements with the same name and namespace;
   b) creating and storing in the memory a delta file with a root element having an element type which is the same as the root element type of the three or more markup language source files;
   c) recording in the delta file stored in memory information about all non-common contents of the three or more markup language source files which is not common to all the source files, wherein for the non-common content every element in the source files has a corresponding element of the same type recorded in the delta file and ancestor elements have corresponding ancestor elements of the same type recorded in the delta file up to and including the root element, for every two elements that are siblings in a source file corresponding elements that are siblings are recorded in the delta file, and all text nodes directly or indirectly within a source file element have corresponding text nodes contained directly or indirectly within the corresponding delta file element;
   d) determining for every subtree in the source files whether or not a common subtree is present in at least one of the other source files; and
   e) recording in the delta file stored in memory common subtrees as equal
   whereby any attribute, text string or subtree that is present and the same in all of the markup language source files is present in the delta file only once in exactly the same format as the attribute, text string or subtree appeared in the source files and any one of the source files is extractable from the delta file and when a source file is removed from the delta file, the information remaining in the resulting delta file remains true with respect to at least step c) and step e) for the remaining markup language source files.

2. A method as claimed in claim 1 wherein one or more attributes are added to one or more of the elements in the delta file representative of generalized equality relationships between the corresponding one or more elements in one or more of the source files.

3. A method as claimed in claim 1, wherein the delta file enables one or more of the source files to be extracted using XQuery.

4. A non-transitory program storage device in which is stored computer readable instructions for generating a markup language delta file representing contents of three or more markup language source files whenever an element type of a root element of each of the three or more markup language source files is the same, the computer readable instructions comprising:
   a) instructions for accessing three or more markup language source files and determining that the element type of the root element of each of the three or more markup language source files is the same, where elements of the same type are elements with the same name and namespace;
   b) instructions for creating and storing in a data storage device a delta file with a root element of the same type as the root element of the three or more markup language source files;
   c) instructions for recording in the delta file stored in the data storage device information about all non-common contents of the three or more markup language source files which is not common to all the source files, wherein for the non-common content every element in the source files has a corresponding element of the same type recorded in the delta file and ancestor elements have corresponding ancestor elements of the same type recorded in the delta file up to and including the root element, for every two elements that are siblings in a source file corresponding elements that are siblings are recorded in the delta file, and all text nodes directly or indirectly within a source file element have corresponding text nodes contained directly or indirectly within the corresponding delta file element;
   d) instructions for determining for every subtree in the source files whether or not a common subtree is present in at least one of the other source files; and
   e) instructions for recording in the delta file stored in the data storage device common subtrees as equal
   whereby any attribute, text string or subtree that is present and the same in all of the markup language source files is present in the delta file only once in exactly the same format as the attribute, text string or subtree appeared in the source files and any one of the source files is extractable from the delta file and when a source file is removed from the delta file, the information remaining in the resulting delta file remains true with respect to at least step c) and step e) for the remaining markup language source files.

5. The non-transitory program storage device in which is stored computer readable instructions for generating a delta file as claimed in claim 4, the computer readable instructions including instructions for adding one or more attributes to one or more of the elements in the delta file to indicate generalized equality relationships between each element as the element appears in one or more of the source files.

6. The non-transitory program storage device in which is stored computer readable instructions for generating a delta file as claimed in claim 4, wherein the delta file enables one or more of the source files to be extracted using XQuery.

\* \* \* \* \*